F. G. & E. A. Floyd.
Broadcast Seeder.
Nº 76,903.      Patented Apr. 21, 1868.
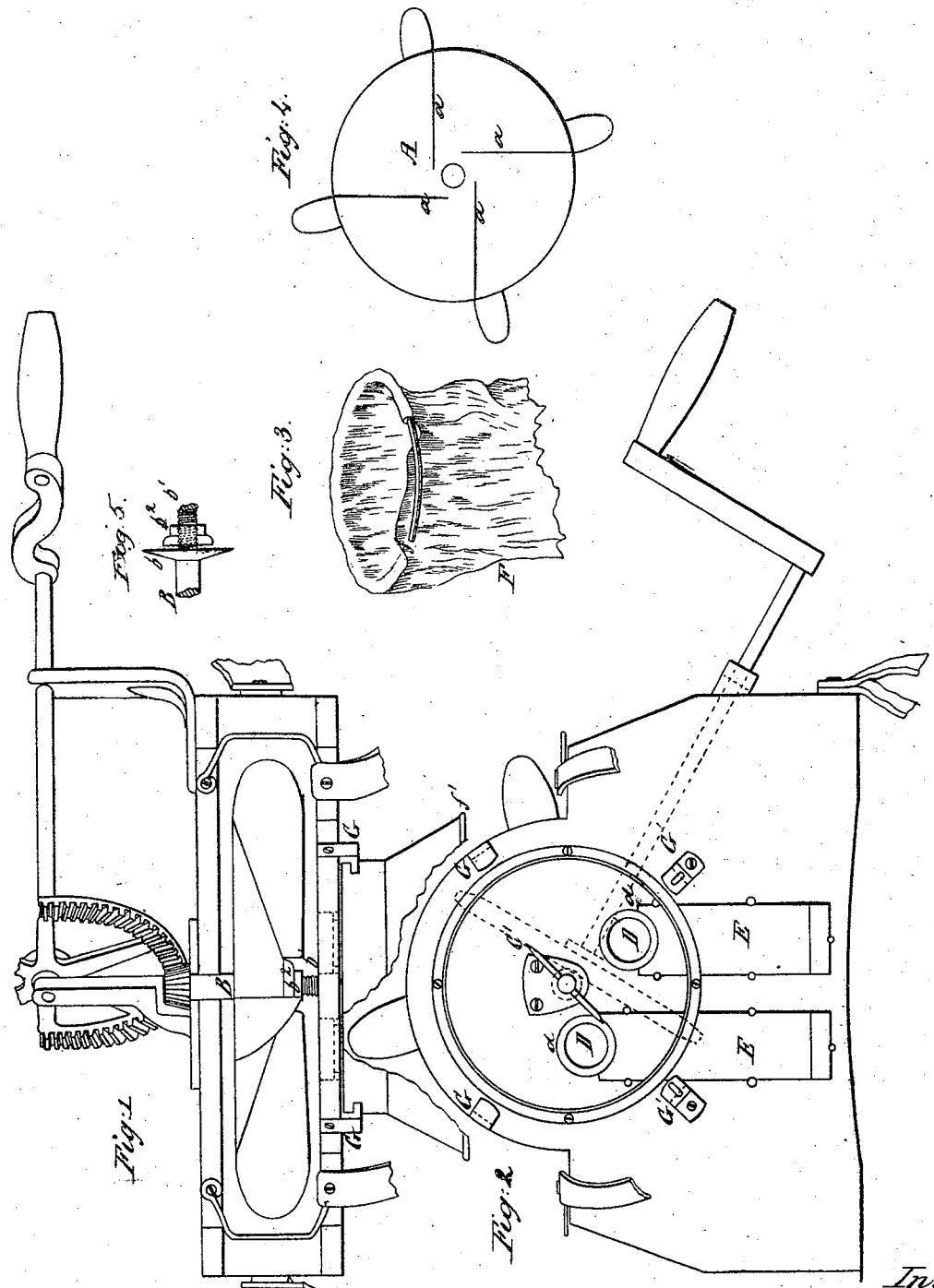
Witnesses
E. R. Beadle
W. E. Stumph
Inventor:
F. G. & E. A. Floyd by
M. W. Beadle Atty

United States Patent Office.

F. G. FLOYD AND E. A. FLOYD, OF MACOMB, ILLINOIS.

*Letters Patent No. 76,903, dated April 21, 1868.*

---

IMPROVED BROADCAST SEED-SOWER.

---

*The Schedule referred to in these Letters Patent and making part of the same.*

---

TO ALL WHOM IT MAY CONCERN:

Be it known that we, F. G. FLOYD, and E. A. FLOYD, of Macomb, in the county of McDonough, and State of Illinois, have invented new and useful Improvements in Broadcast Seed-Sowers; and we do hereby declare that the following is a full and exact description of the same, reference being had to the accompanying drawings, and to the letters of reference marked thereon.

This invention relates to certain improvements upon our broadcast seed-sower, patented April 2, 1867, which consists principally in a novel device for stirring the grain; in a new arrangement of holes for feeding the grain; in a new form of disk for distributing the grain; in an improved method of fastening the disk to the shaft; in providing the feeding-holes with bushings to suit the different sizes of grain; and in a novel method of attaching the bag to the hopper, as will be fully described hereinafter.

Figure 1 represents a perspective view.

Figure 2, a plan view.

Figures 3, 4, and 5, detached parts.

As the general form, construction, and operation in this case do not materially differ from that set forth in our patent, they will not be particularly described here, as it is the improvements alone that are desired to be covered by this application.

In the drawings, A represents an improved form of our disk, which is constructed as formerly, with the exception that the flanges do not radiate in a direct line from the centre, but their inner ends are thrown forward, so that the angle formed by the flanges and the circumference of the disk is less acute.

By this construction, the flanges strike the seed at a different angle and drive it in a different direction.

B represents the main shaft, which is provided with the cap or shoulder $b$, upon which the disk rests, the upper part of which is cut with a thread, $b^1$, as shown, upon which is placed the nut $b^2$. By this arrangement, the disk is held firmly in place upon the shaft, and all looseness is thereby prevented.

Upon the upper end of the shaft, which rises within the hopper C, is placed the stirrer $C'$, constructed of any suitable material. This consists in a straight arm pointed at both ends, which passes through the shaft, an equal distance upon each side; this distance being sufficient to enable them to extend over the centre of the feeding-holes when in revolution. This arrangement may be attached in any suitable way to the shaft.

D D' represent the feeding-holes, provided with the bushings $d$, as shown, which may be made of leather or any other suitable substance, the size of the inner circle being adapted to the size of the grain intended to be sown.

The bushings may be secured in any suitable way. The holes may be tapering, and the bushings of corresponding shape. These holes are so located in regard to the disk, that, when one is opened, the seed is thrown to the right, and, when the other is open, the seed is thrown to the left, it being thrown both right and left when both are open.

This result is accomplished by placing the feeding-holes more or less remote from the desired point of discharge. A certain amount of time must elapse after the seed strikes the disk before it leaves it, and thus the position of the feeding-hole determines, to a great extent, in what direction the seed will be thrown. If it strikes the disk before a flange, which, in a half revolution, will enter the frame, it will be thrown against the back of the frame. If it strikes the disk before a flange, which, in a half revolution, will leave the frame, it will be thrown to the right side. If before a flange which will leave the frame at a quarter revolution, the seed will be carried still further around, and will be thrown upon the left side.

From these remarks, the advantage of having two openings, suitably located, will be readily apparant, for, by such an arrangement, the seed may be thrown either right or left, or in both directions at the same time.

E E represent slides, with curved ends, as shown, which regulate the supplying and cutting off of the seed.

F represents the bag, the lower part of which is provided with the open ring $f$; by which arrangement, it may be placed over the wide mouth of the hopper $F'$, for, as the bag must be strained tightly over the hopper, in order that the seed may not be wasted, it is essential that the hoop should be smaller than the hopper, and, unless open, it could not be put in position; being open, however, it can be slipped out of the hem sufficiently to pass over the hopper.

G G represent permanent catches upon the frame, under which one side of the hoop is caught.

G' G' represent pivoted catches, which swing aside and allow the hoop to be placed in position, where it is firmly held, they being swung forward again for that purpose.

By this arrangement, the bag is easily removed, and put in place again, when desired, and, at the same time, the fastening is perfectly secure, and no seed can, by any possibility, be wasted.

Having thus fully described our invention, what we claim as new, and desire to secure by Letters Patent, is—

1. The disk A, with flanges $a$, which flanges do not radiate in a direct line from the centre, but whose inner ends are inclined forward in the direction of the revolution, as and for the purpose described.

2. The shaft B, with shoulder $b$, thread $b^1$, and nut $b^2$, in combination with disk A, as and for the purpose described.

3. The pointed arm C', in combination with shaft B, as and for the purpose described.

4. The feeding-holes D D', when arranged in relation to each other and to the disk A, substantially as described.

5. The bushings $d$, in combination with holes D D', is and for the purpose described.

6. The bag F, with open ring $f$, in combination with hopper F' and catches G G'.

This specification signed and witnessed, this tenth day of March, 1868.

F. G. FLOYD,
E. A. FLOYD.

Witnesses:
M. T. WINSLOW,
WM. C. STEINMETZ.